Figure 1:
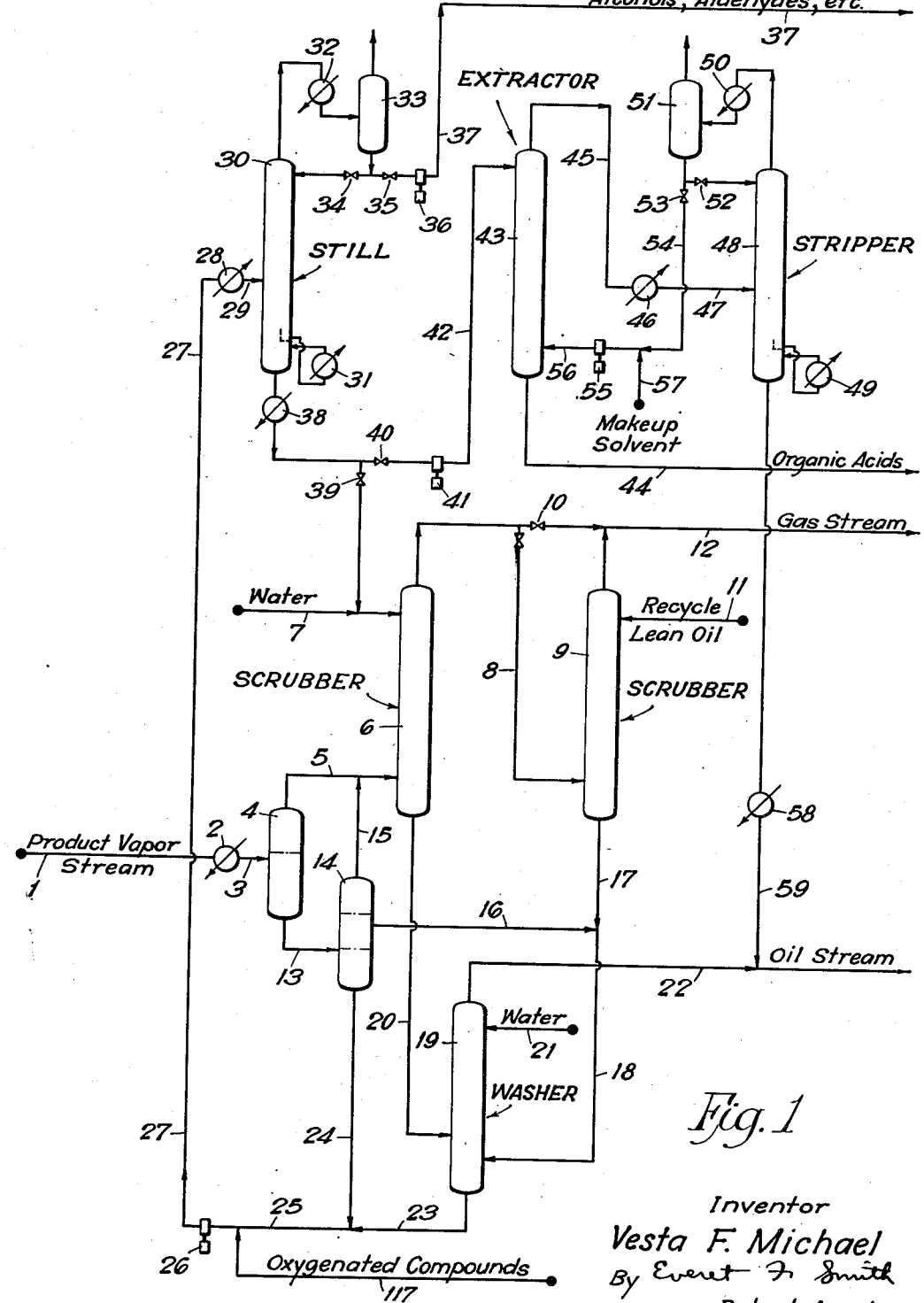

June 14, 1955 V. F. MICHAEL 2,710,829
SEPARATION OF OXYGENATED COMPOUNDS FROM AQUEOUS SOLUTIONS
Filed May 15, 1947 2 Sheets-Sheet 1

Inventor
Vesta F. Michael
By Everet F. Smith
Patent Agent

United States Patent Office 2,710,829
Patented June 14, 1955

2,710,829

SEPARATION OF OXYGENATED COMPOUNDS FROM AQUEOUS SOLUTIONS

Vesta F. Michael, Tulsa, Okla., assignor to Stanolind Oil and Gas Company, Tulsa, Okla., a corporation of Delaware Application May 15, 1947, Serial No. 748,295

4 Claims. (Cl. 202—39.5)

This invention relates to the recovery of organic oxygenated compounds from aqueous solutions thereof, and more particularly to a method for segregating, separating, and purifying alcohols, aldehydes, ketones, and carboxylic acids from mixtures thereof with water.

My invention broadly comprises a novel combination of distillation and extraction steps whereby aqueous solutions of organic oxygenated compounds may be separated substantially completely into groups of generically similar compounds, and the individual components of the resulting fractions may then be isolated.

The prior art discloses numerous methods for preparing organic oxygenated compounds. In some of the methods, the products are produced singly, or in such combinations that separation can be carried out conveniently by well-known means, such as by fractional distillation, or by extraction. Many processes, however, produce a complex mixture of products from which the separation of pure components is exceedingly difficult. For example, the direct oxidation of natural gas or of other hydrocarbon gases, being potentially one of the cheapest sources of oxygenated compounds, has been studied extensively. Unfortunately, however, the products of the oxidation comprise virtually the entire range of the theoretically derivable organic oxygenated compounds, and the commercial development of the process has been delayed because of the difficulty of isolating individual products in saleable condition. The so-called Fischer-Tropsch process is another example of such a process. The Fischer-Tropsch process converts carbon monoxide and hydrogen primarily into hydrocarbons by reaction over a suitable catalyst, such as iron or cobalt; but the reaction simultaneously produces a quantity of oxygenated compounds.

More recently, a new and improved process for the hydrogenation of carbon monoxide has been developed which permits the use of the fluidized-catalyst technique. The use of this new technique with a catalyst of suitable composition in combination with carefully chosen conditions of temperature, pressure, and space velocity gives not only much greater space-time yields, but also a hydrocarbon product stream of a more desirable boiling range and higher octane number. In addition, relatively higher yields of oxygenated compounds are produced.

In one embodiment of the new process, for example, wherein reduced iron catalysts containing around 1% of an alkali-metal compound, such as potassium hydroxide or potassium fluoride, are used to hydrogenate carbon monoxide, a water layer containing up to 15% or more of oxygenated compounds, and a hydrocarbon layer containing up to 40% or more of oxygenated compounds are produced under the following approximate conditions:

Temperature _____ 600–650° F.
Pressure _____ 150–300 lb./in.$^2$, gage.
Space velocity _____ 10–20 cubic feet CO, measured at 60° F. and one atmosphere, per pound of iron per hour.
CO concentration in feed__ 10–20% by vol.
$H_2$:CO ratio in feed_____ 2–8.

The two layers have been found to contain the following oxygenated compounds, and others; acetaldehyde, propionaldehyde, acetone, methanol, methyl acetate, butyraldehyde, ethyl acetate, ethyl methyl ketone, ethanol, n-propyl alcohol, methyl n-propyl ketone, n-butyl alcohol, ethyl butyrate, methyl n-butyl ketone, n-pentyl alcohol, n-decyl alcohol, higher aliphatic alcohols, acetic acid, propionic acid, 2-methylbutyric acid, butyric acid, valeric acid, 3-methylvaleric acid, 2-methylhexanoic acid, caprylic acid, capric acid, myristic acid, palmitic acid, stearic acid, phenol, and higher phenols. The hydrocarbons in the product comprise virtually the entire range of saturated and unsaturated hydrocarbons, from dissolved methane to high-melting waxes. The following table illustrates the daily output of the major oxygenated products of a plant employing the new process to produce 6,000 barrels per day (42 gallons per barrel) of gasoline-range hydrocarbons:

*Aqueous phase*

| | Gal./day |
|---|---|
| Acetaldehyde | 4,247 |
| Propionaldehyde | 873 |
| Acetone | 5,170 |
| Methanol | 333 |
| Butyraldehyde | 1,231 |
| Ethyl methyl ketone | 2,171 |
| Ethanol | 30,322 |
| n-Propyl alcohol | 6,879 |
| n Butyl alcohol | 2,036 |
| n-Pentyl alcohol | 504 |
| Acetic acid | 8,609 |
| Propionic acid | 3,217 |
| Butyric acid | 1,579 |

*Hydrocarbon phase*

| | Gal./day |
|---|---|
| Aldehydes and ketones | 3,964 |
| Alcohols | 4,492 |
| Acids | 3,629 |

It will be obvious to those skilled in the art that the isolation of individual components from such a complex mixture would be exceedingly difficult by any known methods. Simple, direct, fractional distillation of either the hydrocarbon phase or the aqueous phase is not feasible because of the numerous multiple-component azeotropes that are known to exist among the various constituents, and because of the tendency of certain of the compounds to react, decompose, or polymerize when such a mixture is exposed to elevated temperatures for considerable periods of time. Moreover, the prior art discloses no selective solvent or solvents capable of effecting the separation of such mixtures into the individual components.

In my copending applications, Serial No. 771,318, filed August 29, 1947, now abandoned and Serial No. 775,919, filed September 24, 1947, now Patent No. 2,457,257 and in my copending joint application with Scott W. Walker, Serial No. 775,918, filed September 24, 1947, now Patent No. 2,625,560, I have described new techniques for isolating the individual oxygenated compounds from hydrocarbon solutions thereof. For isolating oxygenated compounds from aqueous solution, I have now devised a novel and effective technique, whereby aqueous solutions of oxygenated compounds are separated into two major fractions by means of a primary distillation and an extraction step, and the resulting organic fraction is classified by a double distillation procedure, as described hereinafter, and is then further distilled to isolate the individual components.

The major object of my invention is to provide a method for separating and purifying mixtures of organic oxygenated compounds from aqueous solutions thereof. Another object of my invention is to provide a method for segregating aqueous mixtures comprising organic oxygenated compounds into groups of generically similar compounds. A further object of my invention is to provide a process for recovering organic oxygenated compounds, such as alcohols, aldehydes, ketones, and carboxylic acids, from aqueous solutions thereof, and in particular from aqueous solutions resulting from the oxidation of hydrocarbon gases, or from the hydrogenation of oxides of carbon, in particular carbon monoxide. Another object of my invention is to segregate carboxylic acids from aqueous solutions thereof containing alcohols, aldehydes, and ketones. A still further object is to separate substantially acid-free solvent mixtures from aqueous solutions of organic oxygenated compounds. Other objects of my invention, and its advantages over the prior art, will be apparent from the following description.

In the recovery of oxygenated compounds from aqueous solutions, I have found that the most effective initial step is a fractional distillation to separate the oxygenated compounds into two groups, the alcohols, aldehydes, and ketones being taken off overhead, and the acids being removed in aqueous solution at the bottom of the still. This method is particularly advantageous in preventing the formation of esters, which would still further complicate the problem of separation. I have observed, however, that low-molecular-weight acids, such as acetic acid, persist in distilling with the lighter alcohols, aldehydes, and ketones; and the heavier alcohols, aldehydes, and ketones persist in coming out of the bottom of the fractionator with the acids, almost without regard to the length and efficiency of column employed. If the bottom of the fractionator is maintained at a lower temperature substantially to eliminate the acids from the overhead, part of the higher-molecular-weight alcohols, aldehydes, and ketones escape in the stream from the bottom. If the bottom of the fractionator is maintained at a higher temperature to reduce the quantity of alcohols, aldehydes, and ketones in the bottom stream, part of the low-boiling carboxylic acids are driven into the overhead stream.

To avoid these undesirable results, I have now devised the following surprisingly effective method: By suitable adjustment of the column feed rate, the reflux rate, and the bottom temperature, the top of the fractionator may be maintained at such a temperautre that the overhead is substantially free from acids. Simultaneously, the bottom stream from the fractionator is subjected to extraction with a light hydrocarbon solvent, which I have found to have the ability to remove substantially all of the alcohols, aldehydes, and ketones from the water without removing any substantial proportion of the acids. For this purpose I have successfully used solvents comprising primarily alkanes and alkenes having from three to eight carbon atoms inclusive in the molecule, and mixtures thereof.

Subsequently, the hydrocarbon extract, containing alcohols, aldehydes, and ketones, is stripped of solvent, and the alcohols, aldehydes, and the ketones are subjected to further processing, preferably being returned to the hydrocarbon phase from the new process for hydrogenating carbon monoxide, described above, and then being treated according to the improved techniques in the copending applications referred to in connection therewith.

The aqueous stream of organic acids, now virtually free of organic impurities as a result of the hydrocarbon extraction step, may be processed by various methods to separate the organic acids therefrom. Since the concentration of acids in the aqueous solution is ordinarily comparatively low—of the order of 2 to 5 per cent or less—I prefer first to extract the acids with a suitable solvent; and subsequently, after removal of the solvent from the resulting extract, the acids may be separated in substantially pure form by fractional distillation. For the extraction of the acids from the aqueous solution, a variety of solvents may be used, including esters, such as ethyl acetate, butyl acetate, butyl butyrate, and the like; aliphatic ethers, such as isopropyl ether, butyl ether, and the like; low-boiling aromatic hydrocarbons, such as benzene, toluene, xylenes, and the like; and high-boiling wood-oil fractions. Mixtures of esters or of esters and ethers are especially effective solvents, and I prefer to use a mixed-ester solvent made by esterifying the crude organic-acid mixture obtained from the fluidized catalyst process described above with the crude alcohol mixture obtained from the same source.

The overhead stream from the primary fractionation step may be separated into the individual components in a variety of ways. I have discovered, however, that the most effective technigue is to subject the entire overhead stream to a double classification procedure, wherein the overhead stream is fractionally distilled first into a stream comprising n-butyl alcohol and higher boilers and a stream comprising n-butyl alcohol and lower boilers; and the latter is then further fractionated into a stream comprising butyraldehyde and higher boilers, and a stream comprising methanol, acetone, and lower boilers. The various streams are then subjected to further distillation in a series of fractionating columns to separate the individual components.

An integrated process based on my invention may thus comprise the following steps:

1. Fractional distillation of an aqueous solution of organic oxygenated compounds into an overhead stream of alcohols, aldehydes, and/or ketones, and an aqueous bottom stream comprising organic acids with a diminished content of alcohols, aldehydes, and/or ketones.

2. Extraction of alcohols, aldehydes and ketones from the bottom stream with a selective solvent.

3. Recovery of organic acids from the residual aqueous solution.

4. Separation of solvent from the extract obtained in Step 2, the solvent being recycled, and the residual alcohols, aldehydes, and ketones being returned to process.

5. Separation of the overhead stream in Step 1 into two fractions by distillation: a bottom stream comprising n-butyl alcohol and higher boilers, and an overhead stream comprising n-butyl alcohol and lower boilers.

6. Separation of the overhead stream from Step 5 into two fractions by distillation: a bottom stream comprising butyraldehyde and higher boilers, and an overhead comprising methanol and lower boilers.

7. Further fractional distillation of the various streams from the previous steps.

In Step 5, the division of the organic stream into two fractions at the boiling point of n-butyl alcohol offers the striking advantage that most of the water in the organic stream emerges from the bottom of the still as a heterogeneous mixture with the higher-boiling organic fraction, and may then be separated and recycled to Step 1. The resulting two organic streams may then be redistilled with a minimum of interference resulting from water azeotropes.

In Step 6, the division of the lower-boiling fraction into two fractions between the boiling points of methanol and butyraldehyde offers the additional advantage that the problem of water separation is thereby confined to the resulting higher-boiling fraction, where means for coping with the problem are available.

My invention will be more fully understood from the following specific example, to be read in conjunction with the two flow sheets presented herewith. The example illustrates the application of my invention to the treatment of the aqueous phase from the hydrogenation of carbon monoxide by a process in which the catalyst and reaction conditions were chosen to yield a high conversion to organic oxygenated compounds, as outlined above. It is to be understood, however, that my invention is not restricted to processing such reaction products, but may be employed for the treatment of any of the aqueous solutions of organic oxygenated compounds described herein.

*Example*

The stream of product vapors from a process wherein oxygenated materials are produced is first condensed at least partially and separated into a gas stream, an oil stream, and a water stream, as illustrated in Figure 1. The product vapor stream flows through line 1 into heat interchanger 2, where the normally liquid constituents are condensed partially or completely, and the resulting mixture of gases, oil, and water flows through line 3 into knockout drum 4. The gas stream emerges from the latter through line 5, and is successively passed upward through scrubbers 6 and 9. The liquids from the knockout drum flow through line 13 into separator 14, where the phases are permitted to separate. The separator is vented to gas line 5 through line 15.

Into the top of scrubber 6, a stream of water may be introduced through line 7. Preferably, however, a dilute aqueous solution of water-soluble fatty acids, such as the bottom stream obtained later in the process in topping the aqueous phase from separator 14, is fed into the top of scrubber 6. Substantially all of the water-soluble oxygenated compounds are removed from the gas stream in scrubber 6. Into the top of scrubber 9 is introduced a lean oil through line 11, suitably a portion of a hydrocarbon stream that has been substantially denuded of oxygenated compounds by treatment, for example, as disclosed in my copending application, Serial No. 775,919, filed September 24, 1947. Scrubber 9 may be by-passed by valve 10 if desired. The scrubbed gases, now virtually entirely free of oxygenated compounds, emerge from the top of scrubber 9 through line 12, and may be returned to process or otherwise disposed of.

By regulating the temperature within separator 14, the distribution of oxygenated compounds between the oil and water phases may conveniently be controlled as desired. I have observed that the higher the temperature within separator 14, the lower the concentration of oxygenated compounds in the aqueous phase.

The oil phase from separator 14 is withdrawn through line 16 and combined with the bottoms emerging from scrubber 9 through line 17, and the mixture is passed through line 18 into the bottom of washer 19. The aqueous bottoms emerging from scrubber 6 through line 20 are introduced into washer 19 at an intermediate point, and into the top of washer 19 is introduced a stream of fresh water through line 21. As the oil stream rises through washer 19, it is therefore scrubbed successively with a dilute aqueous solution of oxygenated compounds and then with fresh water. Substantially all of the water-soluble oxygenated compounds are thereby removed from the oil stream, which emerges through line 22 and is then further treated, for example, as in my copending application referred to immediately above.

The water stream from separator 14 is withdrawn through line 24 and mixed with the aqueous bottoms emerging from washer 19 through line 23. The aqueous mixture is transferred by pump 26 through line 27, heater 28, and line 29 into fractionating column 30, equipped with reboiler 31. Column 30 is operated at a reflux ratio around 40 to 1, and the top temperature is maintained below about 175° F. by a suitable adjustment of the feed and bottom temperatures. Under these conditions, distillation of a water stream containing 11% distillables other than organic acids gave the following results:

| Overhead vapor temperature, °F. | Acidity of overhead, percent as acetic | Non-acidic distillables in bottoms, ml./gal. |
| --- | --- | --- |
| 172 | 0.02 | 2.3 |
| 176 | 0.16 | 0.3 |
| 180 | 0.56 | 0.1 |
| 184 | 0.84 | 0.0 |

Alternatively, column 30 may be operated under moderate pressure, suitably up to around 50 lb./in.², gage, with an appropriate adjustment of operating temperatures, in order to minimize the loss of low boilers through volatilization. From the top of the fractionating column, vapors pass into condenser 32, and the condensate, comprising primarily alcohols, aldehydes, ketones, and water, flows into reflux bottle 33. Part of the condensate is refluxed to the top of column 30 through valve 34, and the remainder is taken off through valve 35, pump 36, and line 37 and further processed as shown in Figure 2.

The bottom stream from fractionator 30 flows through cooler 38, and may then be divided. Part of it may be recycled through valve 39 and line 7 to scrubber 6. The remainder flows through valve 40 and is transferred by pump 41 through line 42 into extraction column 43, where it passes downward, countercurrent to an upward-flowing stream of light hydrocarbons, such as a petroleum naphtha comprising mainly hexanes and hexenes, the alcohols, aldehydes, and ketones contained therein being extracted thereby. From the bottom of extractor 43, an aqueous solution of organic acids flows through line 44 to equipment (not shown) for recovery of the acids.

From the top of extraction column 43 a light-hydrocarbon solution of alcohols, aldehydes, and ketones flows through line 45, heater 46, and line 47 into stripping still 48, where the light hydrocarbons are stripped out by reboiler 49. The hydrocarbons emerge from the top of the still through condenser 50 into reflux bottle 51, and are there divided, part of the stream being refluxed through valve 52 to stripper 48, and the remainder being taken off through valve 53 and line 54 and returned by pump 55 through line 56 to the bottom of extraction column 43. Makeup solvent is added as required through line 57 to pump 55. The alcohol, aldehyde, and ketone stream emerging from the bottom of stripper 48 passes through cooler 58 and line 59, and is preferably combined in line 22 with the hydrocarbon product stream, containing oil-soluble oxygenated compounds. The hydrocarbon stream may be processed according to my copending applications, Serial No. 775,919, filed September 24, 1947, Serial No. 771,318, filed August 29, 1947, or my copending joint application with Scott W. Walker, Serial No. 775,918, filed September 24, 1947.

Figure 2:
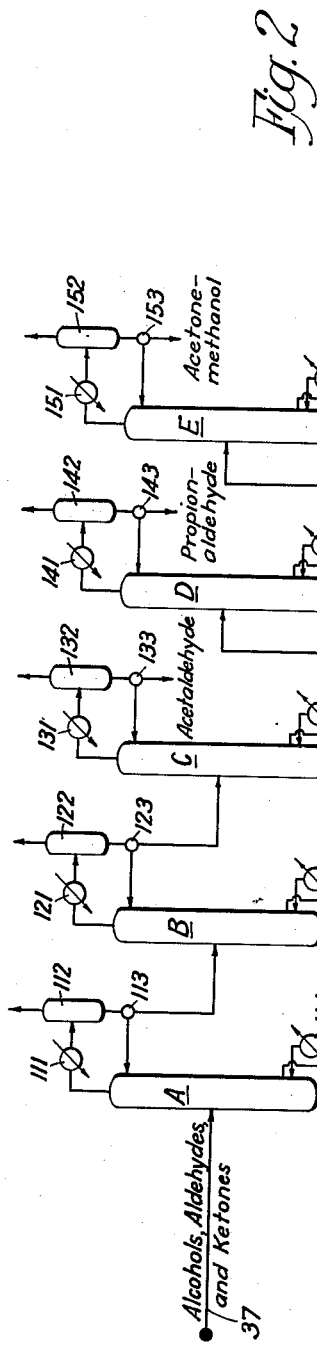
Figure 2:
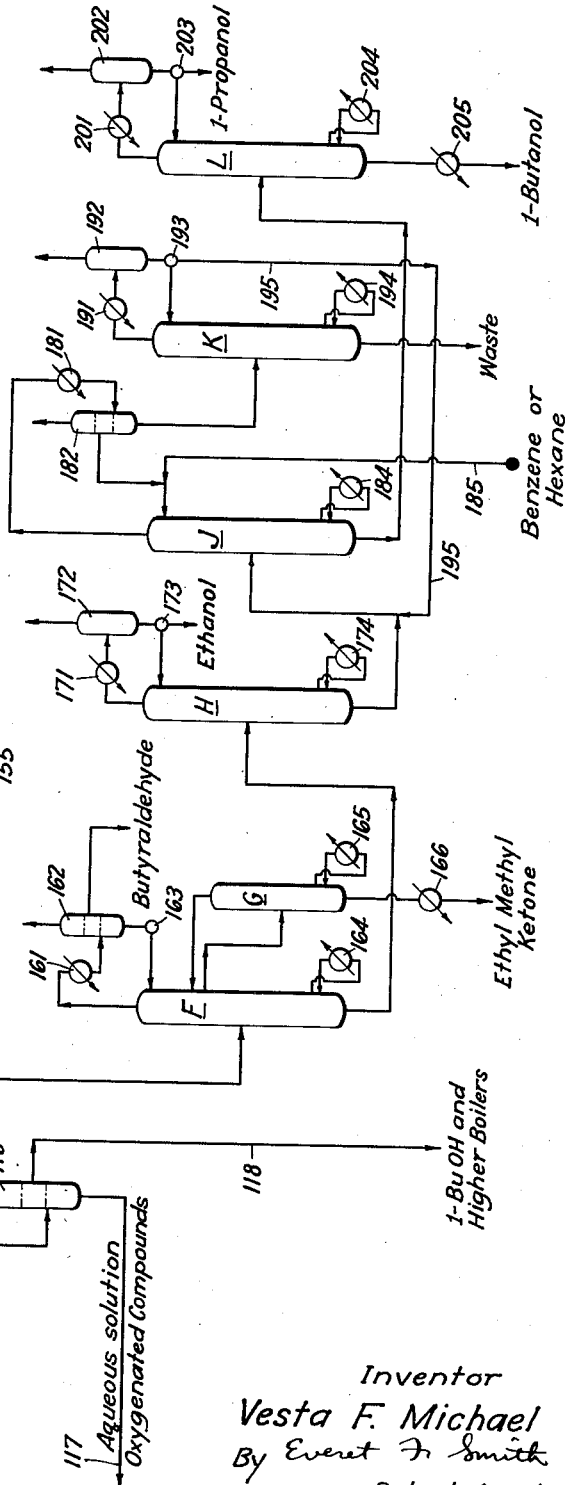

The alcohol, aldehyde, and ketone stream in line 37 is introduced into fractionating column A (Figure 2). A bottom stream comprising water, n-butyl alcohol, and higher boilers is removed from column A through cooler 115 to separator 116, from which the aqueous phase is returned to process through line 117, ordinarily to fractionating column 30 (Figure 1), and the water-insoluble phase, comprising n-butyl alcohol and higher-boiling alcohols, aldehydes, and ketones, is withdrawn through line 118 and further processed to separate the individual constituents, as, for example, in a batch still or in a series of fractionating columns (apparatus not shown).

The overhead from column A, comprising n-butyl alcohol and lower boilers, passes through condenser 111 into receiver 112 and out through valve 113, where the stream is divided, part of it being refluxed to column A, and the remainder passing into column B for further fractionation.

From the bottom of column B, a stream comprising butyraldehyde and higher boilers is withdrawn and sent to column F for further fractionation. From the top of column B, a stream comprising mainly methanol, acetone, and lower boilers is withdrawn and passed into column C for further fractionation.

In column C, acetaldehyde is distilled overhead as a substantially pure compound, and the bottoms are sent to column D.

In column D, propionaldehyde is distilled overhead as a substantially pure compound, and the bottoms are sent to column E.

In column E, a mixture of acetone and methanol is distilled overhead, and the bottoms are sent, in combination with the bottoms from column B, to column F for further fractionation.

In column F, butyraldehyde is distilled overhead and taken off from separator 162. Any water distilling with the butyraldehyde is separated and refluxed to the column through valve 163. A side stream from column F is stripped in column G and ethyl methyl ketone is taken off at the bottom of column G. The bottoms from column F are passed into column H for further fractionation.

In column H, ethanol is distilled overhead, ordinarily in the form of its water azeotrope. The bottoms from column H are sent to column J.

Any water remaining in the bottom stream from column H is removed azeotropically in column J. An azeotrope-former such as benzene or hexane is added to column J through line 185, and the water azeotrope, in combination with a quantity of n-propyl and n-butyl alcohols, is taken off overhead through condenser 181 to separator 182. The azeotrope-former layer is separated and returned to column J, and the aqueous layer, containing dissolved organic material, is sent to column K for stripping. From the bottom of column J, a dry stream consisting almost entirely of n-propyl and n-butyl alcohols is removed and sent to column L for final fractionation.

In column K, dissolved benzene or hexane and alcohols are stripped out of the water stream from separator 182, and are returned through line 195 to column J. The bottom stream from column K is primarily water, and may either be discarded or returned to process as desired.

In column L, n-propyl alcohol is taken off overhead, and n-butyl alcohol is withdrawn from the bottom.

The foregoing example is intended only as an illustration of the preferred form of my invention, and I do not wish to be limited thereby in any way. In general, it may be said that any modifications or equivalents that would ordinarily occur to those skilled in the art are to be considered as lying within the scope of my invention.

The term "generically similar compounds" occurring herein is to be understood as meaning classes of compounds having similar chemical properties. Under this definition, alcohols constitute such a class, and phenols are another. Ketones, aldehydes, and carboxylic acids are other groups of generically similar compounds.

In accordance with the foregoing specification, I claim as my invention:

1. In a process for separating water soluble oxygenated organic compounds from an aqueous mixture comprising alcohols, aldehydes, ketones and carboxylic acids wherein at least the major portion of said alcohols, aldehydes and ketones form with one another a series of close boiling binary azeotropes and wherein said compounds are separated into a first fraction containing essentially said carboxylic acids together with a substantially reduced amount of said alcohols, aldehydes and ketones and a second fraction substantially free from carboxylic acids and consisting primarily of said alcohols, aldehydes, and ketones, the improvement which comprises subjecting said first fraction to extraction with a light hydrocarbon solvent to selectively extract the alcohols, aldehydes, and ketones therefrom.

2. In a continuous process for separating water soluble oxygenated organic compounds from an aqueous mixture comprising alcohol, aldehydes, ketones and carboxylic acids wherein said compounds are separated into a first fraction containing essentially said carboxylic acids together with a substantially reduced amount of said alcohols, aldehydes and ketones and a second fraction substantially free from carboxylic acids and consisting primarily of said alcohols, aldehydes and ketones, the improvement which comprises subjecting said second fraction to further distillation to secure overhead a distillate (1) comprising n-butyl alcohol and lower boilers and an aqueous heterogeneous bottoms stream (1), allowing said bottoms stream (1) to stratify into an upper organic layer comprising n-butyl alcohol and higher boilers and a lower aqueous layer, returning the latter to said aqueous mixture; separating distillate (1) by further fractional distillation into a distillate (2) comprising methanol and lower boilers and a bottoms stream (2) comprising butyraldehyde and the higher boilers; further distilling distillate (2) to separate acetaldehyde, propionaldehyde and a mixture of acetone and methanol as successive overhead fractions and a bottoms stream (3) comprising butyraldehyde and higher boilers; combining said bottoms streams (2) and (3) and further distilling said streams to separate butyraldehyde, methyl ethyl ketone and ethanol, leaving a bottoms stream (4) comprising n-propyl and n-butyl alcohols; removing any water contained in said bottoms stream (4) by azeotropic distillation; and fractionally distilling the resulting dry bottoms to separate n-propyl alcohol as an overhead fraction and n-butyl alcohol as a bottoms fraction.

3. In a continuous process for separating water soluble organic oxygenated compounds from an aqueous mixture thereof produced by the catalytic hydrogenation of carbon monoxide to produce a liquid hydrocarbon phase and a liquid water phase containing water soluble alcohols, aldehydes, ketones and carboxylic acids, the improvement which comprises subjecting a fraction from said water phase containing primarily alcohols, aldehydes and ketones and substantially free from carboxylic acids to fractional distillation to produce a distillate (1) comprising n-butyl alcohol and lower boilers and an aqueous heterogeneous bottoms stream (1) comprising n-butyl alcohol and higher boilers and a lower aqueous layer, returning the latter to said aqueous mixture; separating said distillate (1) by fractional distillation into a distillate (2) comprising methanol and lower boilers and a bottoms stream (2) comprising butyraldehyde and higher boilers, further distilling said distillate (2) to separate acetaldehyde, propionaldehyde and a mixture of acetone and methanol as successive overhead fractions and a bottoms fraction (3) comprising butyraldehyde and higher boilers; combining said bottoms fractions (2) and (3) and further distilling the resulting mixture to separate butyraldehyde, methyl ethyl ketone and ethanol as successive overhead fractions and a bottoms fraction (4) comprising n-propyl and n-butyl alcohols; drying said bottoms fraction (4) and fractionally distilling the resulting dry bottoms fraction to separate n-propyl alcohol as an overhead fraction and n-butyl alcohol as a bottoms product.

4. In a continuous process for the synthesis of liquid hydrocarbons and valuable oxygenated organic compounds from carbon monoxide and hydrogen in the presence of a fluidized iron catalyst under known synthesis conditions to produce a liquid hydrocarbon phase and a liquid water phase containing water soluble alcohols, aldehydes, ketones and carboxylic acids, the improvement which comprises subjecting a fraction from said water phase containing primarily alchols, aldehydes and ketones and substantially free from carboxylic acids to fractional distillation to produce a distillate (1) comprising n-butyl alcohol and lower boilers and an aqueous heterogeneous bottoms stream (1) comprising n-butyl alcohol and higher boilers and a lower aqueous layer, returning the latter to said aqueous mixture; separating said distillate (1) by fractional distillation into a distillate (2) comprising methanol and lower boilers and a bottoms stream (2) comprising butyraldehyde and higher boilers, further distilling said distillate (2) to separate acetaldehyde, propionaldehyde and a mixture of acetone and methanol as successive overhead fractions and a bottoms fraction (3) comprising butyraldehyde and higher boilers; combining said bottoms fractions (2) and (3) and further distilling the resulting mixture to separate butyraldehyde, methyl ethyl ketone and ethanol as successive overhead fractions and a bottoms fraction (4) comprising n-propyl and n-butyl alcohols; drying said bottoms fraction (4) and fractionally distilling the resulting dry bottoms fraction to separate n-propyl alcohol as an overhead fraction and n-butyl alcohol as a bottoms product.

References Cited in the file of this patent

UNITED STATES PATENTS

| Number | Name | Date |
|---|---|---|
| 1,702,495 | Clapp | Feb. 19, 1929 |
| 2,080,194 | Barbet | May 11, 1937 |
| 2,095,347 | Reichardt | Oct. 12, 1937 |
| 2,166,584 | Deanesly | July 18, 1939 |
| 2,238,016 | Downey | Apr. 8, 1941 |
| 2,274,750 | Soenksen | Mar. 3, 1942 |
| 2,297,839 | Montgomery | Oct. 6, 1942 |
| 2,337,489 | Patterson | Dec. 21, 1943 |
| 2,392,534 | Von Kevssler | Jan. 8, 1946 |
| 2,476,788 | White | July 19, 1949 |
| 2,501,115 | White | Mar. 21, 1950 |
| 2,516,940 | Arnold et al. | Aug. 1, 1950 |
| 2,533,675 | Marschner | Dec. 12, 1950 |
| 2,551,593 | Gilliland et al. | May 8, 1951 |
| 2,558,557 | Hess et al. | June 26, 1951 |
| 2,568,841 | Arnold | Sept. 25, 1951 |

OTHER REFERENCES

Robinson and Gilliland, Elements of Fractional Distillation, 3rd edition, 1939, pgs. 13, 14, 17, 20 to 24, 132 to 139, 245 to 249.